United States Patent [19]
Graf

[11] Patent Number: 6,056,856
[45] Date of Patent: *May 2, 2000

[54] BLOWER FOR AN AIR/WATER SEPARATOR IN A PAPER-MAKING MACHINE

[75] Inventor: Edwin X. Graf, Menasha, Wis.

[73] Assignee: Voith Sulzer Paper Technology North America, Inc., Appleton, Wis.

[*] Notice: This patent is subject to a terminal disclaimer.

[21] Appl. No.: 08/963,707

[22] Filed: Nov. 4, 1997

[51] Int. Cl.[7] .............................. D21F 1/48; B01D 19/00; B63H 1/26

[52] U.S. Cl. .............................. 162/364; 95/261; 96/214; 96/216; 416/241 A; 416/241 R; 29/889.3; 29/889.71; 162/190; 162/264; 162/348; 162/363

[58] Field of Search ...................... 162/190, 264, 162/348, 363, 364; 95/261, 260; 96/208, 209, 214, 216; 416/241 A, 241 R; 29/889.7, 889.71, 889.3

[56] References Cited

U.S. PATENT DOCUMENTS 2,601,519  6/1952  Hardy et al. .............................. 261/29
4,040,770  8/1977  Carlson ..................................... 416/230
5,851,358  12/1998  Kade ......................................... 162/276

FOREIGN PATENT DOCUMENTS 363282433  11/1988  Japan.

Primary Examiner—Peter Chin
Assistant Examiner—Dionne A. Walls
Attorney, Agent, or Firm—Talyor & Aust, P.C.

[57] ABSTRACT

A paper-making machine includes a wet end associated with a wet fiber web, a headbox having an outlet gap, and a forming fabric positioned adjacent to the outlet gap and moving in a direction of web travel. An air/water separator is positioned in association with the forming fabric and downstream from the headbox relative to the direction of web travel. The air/water separator is configured for receiving liquid from the fiber web. A blower having a housing and an impeller is fluidly connected with the air/water separator. The impeller is rotatably carried by and within the housing and has a rotating hub with a periphery. The impeller also has a plurality of vanes attached to and extending from the hub and substantially equally spaced around the periphery. The vanes are formed of a non-metallic, composite material and have a coating of a layer of hydrophobic material substantially covering the composite material.

13 Claims, 4 Drawing Sheets

BLOWER FOR AN AIR/WATER SEPARATOR IN A PAPER-MAKING MACHINE

BACKGROUND OF THE INVENTION

1. Field of the Invention

The present invention relates to paper-making machines, and, more particularly, to paper-making machines having a wet end with a liquid collection device.

2. Description of the Related Art

A paper-making machine includes a forming fabric, traditionally known as a "wire", in a forming section at the wet end of the machine. The fiber suspension is discharged from a headbox onto the forming fabric. More than one forming fabric may be provided in the forming section of the paper-making machine for sequentially contacting and/or carrying the wet fiber web through the wet end of the machine. Each forming fabric typically is in the form of a woven polymeric mesh material with voids defined by the mesh. A portion of the water in the fiber suspension passes through the voids in the forming fabric, while another portion of the water in the fiber suspension may be retained within the voids as a result of adhesion forces between the water and forming fabric.

Each forming fabric is typically in the form of an endless fabric carried by a plurality of rolls. As the forming fabric approaches a roll at running speed, a converging area is defined by the forming fabric and roll. Since the forming fabric and roll are of course not perfectly smooth surfaces, some frictional resistance between the forming fabric, roll and air in the converging area is created which causes a flow of air toward the point of contact between the forming fabric and roll. The flowing air is pushed out through the forming fabric at the contact location between the forming fabric and roll, thus creating a mist of water on the side of the forming fabric opposite the roll. As the forming fabric is carried around a portion of the periphery of the roll, some of the water in the voids of the forming fabric is attracted via adhesion forces to the surface of the roll. At the point of separation or divergence between the forming fabric and roll, the adhesion forces between the water and roll cause at least a portion of the water in the forming fabric to be drawn out of the voids in the forming fabric and fall via gravitational force from the diverging area between the forming fabric and roll.

A doctor element, such as a doctor blade, can be placed such is that it bears against a roll and cleans the roll by scraping fibers off the roll. A water shower is typically provided in association with the doctor blade for lubricating the doctor blade as it bears against the roll. The shower directs a stream of water against the roll across the width of the doctor blade and on the approach side of the doctor blade. The water inhibits wear and heating as a result of the frictional forces between the doctor blade and roll.

A liquid collection device including a suction chamber and an air/water separator can be used to catch water precipitating from the forming fabric and the from the roll in the area between the forming fabric and the doctor element. The suction chamber, extending across the width of the forming fabric, includes an at least partially open top and an outlet. The open top of the suction chamber can be placed between and below the area of divergence between the forming fabric and roll and the doctor element in order to catch the precipitating water. The air/water separator receives liquid from the suction chamber outlet.

It is known to mount a vacuum generating device on top of an air/water separator in order to generate a vacuum within the suction chamber to draw the liquid within the suction chamber into the air/water separator. Such a vacuum generating device can be in the form of a centrifugal blower or fan having a metal hub and vanes and which is mounted on top of the air/water separator. The centrifugal blower draws the water as well as a mixture of fiber laden mist and air through the suction chamber, into the air/water separator, and blows the fiber/mist/air mixture into the ambient environment.

A problem with a blower or fan as described above is that the moisture in the air drawn by the blower allows the fibers to adhere to the vanes or blades of the blower. These fibers can build up on the vanes to the point where the weight of the fibers causes the blower to be out of balance. Due to the added load of this imbalance, the blower ball bearings may fail as a result thereof. The problem is exacerbated by the relative weightiness of the metal material of which the blower vanes and hub are formed. Because of the weight of the blower vanes and hub, more stress is placed on the ball bearings and any rotational imbalance is magnified.

Another problem is that the vanes and hub are formed of a relatively heavy material, such as metal, and may be out of balance. The high rotational speed of a blower in a paper machine combined with the relative weightiness of the vanes and hub may cause higher amplitude vibration of the blower in operation. This higher amplitude vibration may lead to premature bearing failure.

It is also known, with such a blower configuration, to periodically disassemble the centrifugal blower and wash the vanes to rid them of the accumulated fibers. This, however, is an expensive process which may require frequent downtime.

What is needed in the art is a centrifugal blower for use in the wet end of a paper-making machine which is lighter, stronger, repels fiber laden water, and may be cleaned "on the fly," thus being able to rotate faster, being less susceptible to rotational imbalance and reducing downtime associated with cleaning.

SUMMARY OF THE INVENTION

The present invention provides a paper-making machine including a blower for use with an air/water separator which, by virtue of both being water repellant and being formed of a strong, lightweight material, is not susceptible to the rotational imbalance that results from fiber build up and may be cleaned during operation.

The invention comprises, in one form thereof, a paper-making machine includes a wet end associated with a wet fiber web, a headbox having an outlet gap, and a forming fabric positioned adjacent to the outlet gap and moving in a direction of web travel. An air/water separator is positioned in association with the forming fabric and downstream from the headbox relative to the direction of web travel. The air/water separator is configured for receiving liquid from the fiber web. A blower having a housing and an impeller is fluidly connected with the air/water separator. The impeller is rotatably carried by and within the housing and has a rotating hub with a periphery. The impeller also has a plurality of vanes attached to and extending from the hub and substantially equally spaced around the periphery. The vanes are formed of a non-metallic, composite material and have a coating of a layer of hydrophobic material substantially covering the composite material.

An advantage of the present invention is that the polytetrafluoroethylene (PTFE) coating on the blower impeller sheds water and does not allow fibers to adhere to the impeller, thus avoiding problems associated with imbalanced mass, such as bearing wear.

Another advantage is that the relatively light weight of the graphite composite material of the impeller reduces imbalance of the impeller and the forces exerted on the bearing when any impeller imbalance occurs, thus allowing the impeller to rotate faster and preventing early bearing failure.

Yet another advantage is that the strength of the graphite composite material of the blower vanes allows the vanes to be rotated faster while still withstanding the impact of the airborne fibers.

A further advantage is that the non-metallic material of the impeller is not subject to corrosion even when subjected to the moisture of the wet end of a paper-making machine.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
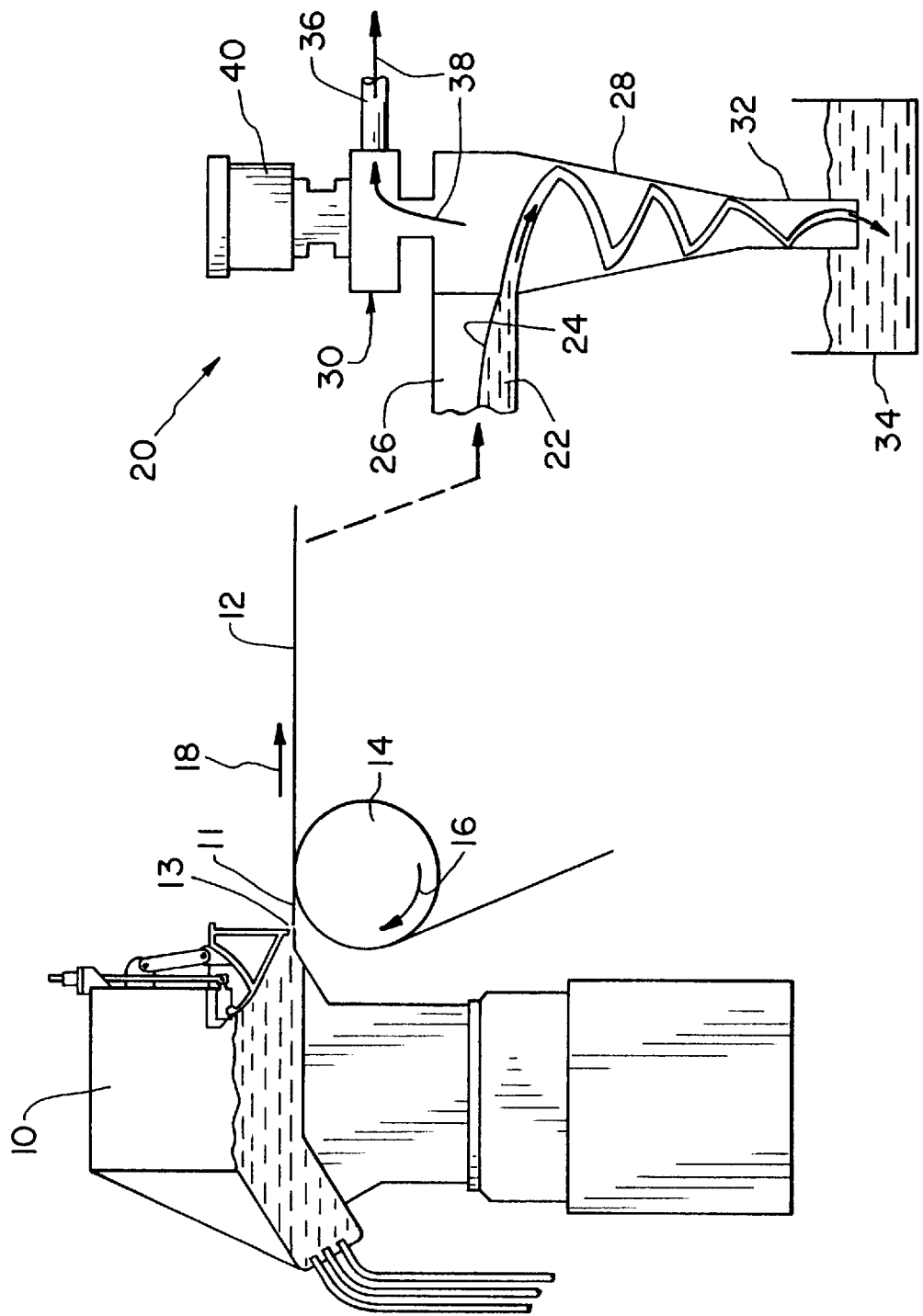
FIG. 1 is a schematic, side view of a portion of a papermaking machine, including an embodiment of a blower and associated air/water separator of the present invention.

Referring now to the drawings and more particularly to FIG. 1, there is shown a schematic, side view of a portion of a paper-making machine including a headbox 10, forming fabric 12, breast roll 14, and liquid collection device 20 having a vacuum generating device 30.

Headbox 10 receives a flow of fiber suspension and jets a stream of fiber suspension 11 through an outlet gap 13 onto an adjacent forming fabric 12 for forming a fiber web (not shown). Breast roll 14 is driven by a suitable drive (not shown) and rotates in the direction indicated by arrow 16. Forming fabric 12 is carried by roll 14 and moves in the travel direction indicated by arrow 18. Forming fabric 12 is an endless forming fabric, which is configured to carry and/or engage the wet fiber web along a portion of the length thereof. Liquid collection device 20 catches water 22 which either falls from the wet fiber web through forming fabric 12 via gravitational force or is squeezed out of the wet fiber web by one or more rolls (not shown) similar to roll 14 and falls therefrom. Some portion of the falling water never reaches a surface 24 of water 22, but rather remains suspended in the air as mist (not shown) before being drawn out of liquid collection device 20, as will be explained hereinafter. Both the mist and water 22 include pulp fibers suspended within.

Liquid collection device 20 includes a suction chamber (not shown) which is placed at a desired location in the wet end of the paper-making machine adjacent to forming fabric 12 and/or a roll for collection of water and mist. The suction chamber has a partially open top which collects water falling from forming fabric 12. The suction chamber extends generally parallel to roll 14 and has a length which is approximately the same as or slightly longer than that of roll 14. Liquid collection device 20 also includes an outlet 26, an air/water separator 28 and a vacuum generating device 30.

Air/water separator 28 is connected to outlet 26 of the suction chamber and receives water from the suction chamber via outlet 26. In the embodiment shown, air/water separator 28 is configured as a cyclone separator 28; however, other types of air/water separators may be used. Water enters cyclone separator 28 near the top of separator 28 and at a tangent relative to an inner wall of separator 28. As a result, water flows in a spiral manner towards the bottom of cyclone separator 28 and exits through outlet 32 into basin 34.

Vacuum generating device 30 is mounted on top of cyclone separator 28 and generates a vacuum within the suction chamber to draw the liquid within the suction chamber into cyclone separator 28. A mixture of air, mist and pulp fibers suspended above the liquid is also drawn into cyclone separator 28 by vacuum generating device 30. In the embodiment shown, vacuum generating device 30 is in the form of a centrifugal blower 30 which is mounted on top of cyclone separator 28. The term "blower", as used in this application, is intended to cover a blower, fan or other air blowing device. The centrifugal blower 30 blows the mixture of mist, air and pulp fibers from a discharge nozzle 36 into the ambient environment. The air/mist/fiber mixture originates from the inlet to the suction chamber and is drawn through the suction chamber, outlet 26 and into separator 28 along with water 22 from the suction chamber. Water 22 falls via gravitational force and exits through the outlet 32 of cyclone separator 28. The air and airborne mixture of mist and pulp 10 fibers, on the other hand, separates from water 22 and travels through centrifugal blower 30 to the ambient environment, as indicated by arrows 38.

Figure 2:
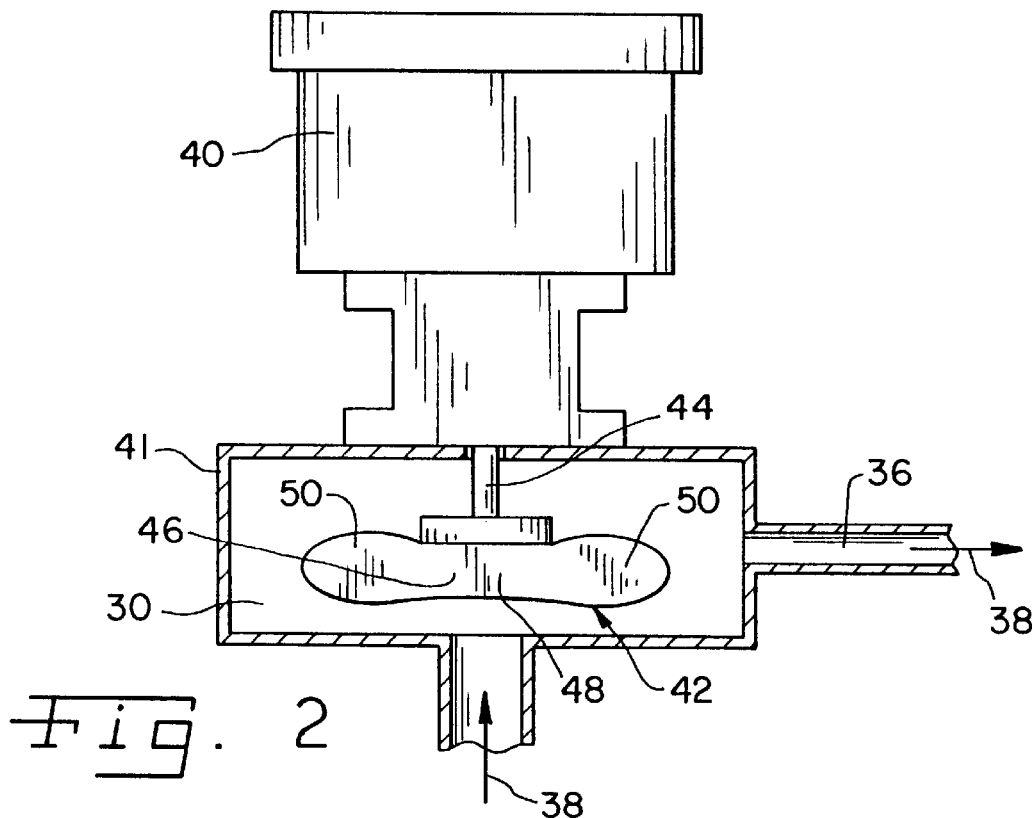
FIG. 2 is an enlarged schematic, side view of the centrifugal blower shown in FIG. 1.

Referring now to FIG. 2, an enlarged, sectional view of centrifugal blower 30 is shown. An electric motor 40 is mounted on a housing 41 of centrifugal blower 30 and drives a shaft 44 which in turn drives a rotating impeller 42. Rotating impeller 42 is rotatably carried by and within housing 41. Impeller 42 has a cylindrical rotating hub 46 with an annular periphery 48 with a plurality of vanes projecting therefrom, two of which are shown and referenced as 50 in FIG. 2. Any number of vanes 50 can be included on hub 46. Vanes 50 are shown as being substantially equally spaced around periphery 48 to rotationally balance impeller 42. Both hub 46 and vanes 50 of impeller 42 are fabricated of a strong, lightweight, non-magnetic material, such as a graphite or fiberglass composite, although other strong, lightweight substances can also be used. In order to avoid the creation of any structurally weak points such as, for example, joints or seams, hub 46 and vanes 50 are monolithically constructed of one continuous piece as shown.

Figure 3:
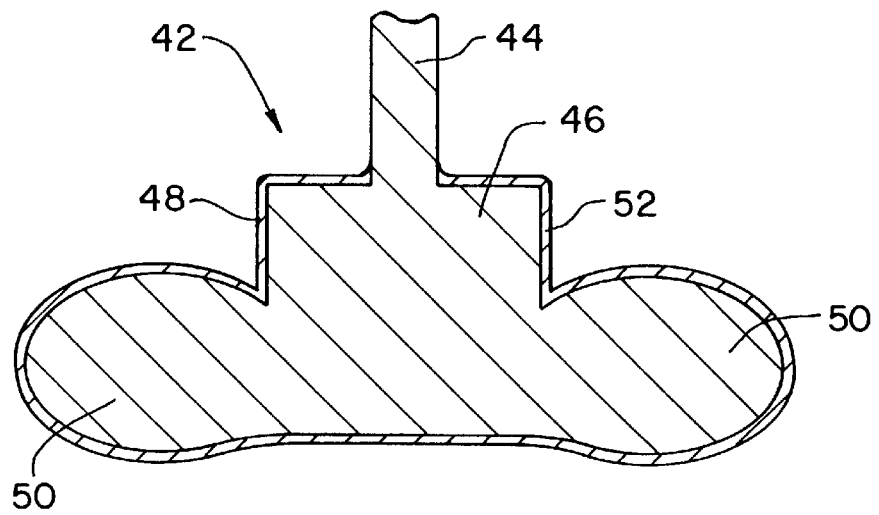
FIG. 3 is a side, sectional view of the impeller of the centrifugal blower shown in FIG. 2.

As shown in the side, sectional view of FIG. 3, both hub 46 and vanes 50 are coated with a layer 52 of a hydrophobic or water-repellant material, such as PTFE, also commonly known as "ITEFLON" (a trademark of E. I. DuPont de Nemours). Coating 52 is applied to the entire outside surface of impeller 42, including hub 46 and vanes 50. Essentially, however, coating 52 need only be applied to any surface of impeller 42 with which mist and/or pulp fibers could potentially come in contact and build up.

During use, water from forming fabric 12 falls into the suction chamber of liquid collection device 20. Water 22 in the suction chamber flows through the suction chamber, outlet 26 and into separator 28 as a result of the vacuum pressure drawn on the suction chamber using centrifugal blower 30. Water 22 enters the top of cyclone separator 28 at a tangent to the inner wall and flows in a spiraling path downward through cyclone separator 28.

Water 22 exits outlet 32 of cyclone separator 28 and flows into basin 34. The mixture of air, mist and pulp fibers which is separated from water 22 at the top of cyclone separator 28 flows through centrifugal blower 30 and into the ambient environment. The water droplets and fibers collide with vanes 50 as the airborne mixture flows through blower 30. The strength of the composite material of impeller 42 prevents any structural damage which might otherwise result from the collision of the mixture; while the light weight of the graphite composition minimizes wear on the ball bearings (not shown) on which hub 46 rotates. The hydrophobic or water repelling properties of PTFE coating 52 allows impeller 42 to shed the impacting water droplets as it rotates, aided by the centrifugal force of the rotation. Pulp fibers generally tend to adhere to liquids such as water. But without the adhesive effect of water, the airborne fibers, just as the water droplets, will not substantially cling to vanes 50 and hub 46. Rather, the pulp fibers will be shed and expelled out of discharge nozzle 36 by the air pressure created by rotating centrifugal blower 30.

Wet pulp fibers, although less numerous than those found in water 22, are suspended in the air which is separated from water 22 in separator 28. If a liquid pump was used to pump water 22 within the suction chamber and create a vacuum within the suction chamber, fibers within water 22 would likely build up on the pump and inhibit operation of the pump. Similarly, wet pulp fibers, suspended in the air flowing through centrifugal blower 30, would adhere to vanes 50 of blower 30 if not for the water-repellant properties of PTFE coating 52 on vanes 50.

Figure 4:
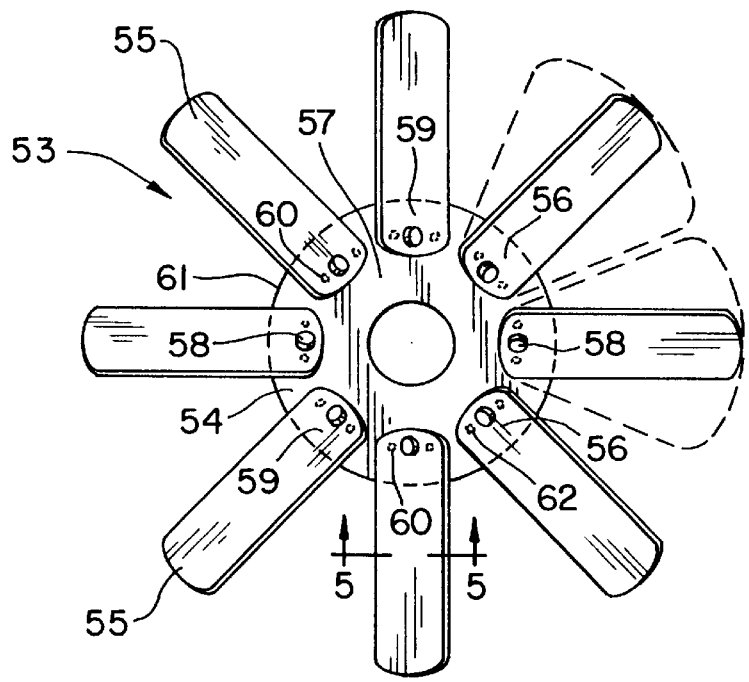
FIG. 4 is a top view of another embodiment of an impeller of the blower of the present invention.

Another embodiment of an impeller 53 of the present invention is shown in the top view of FIG. 4. Impeller 53 is an axial flow impeller as opposed to a radial flow (centrifugal) impeller. Rather than being of monolithic construction, eight narrow vanes 55 are shown as being screwed onto a top surface 54 of hub 57 along periphery 61 of hub 57. Alternatively, vanes 55 can be substantially wider (shown in phantom lines) and can even overlap when viewed from a top view.

Figure 5:
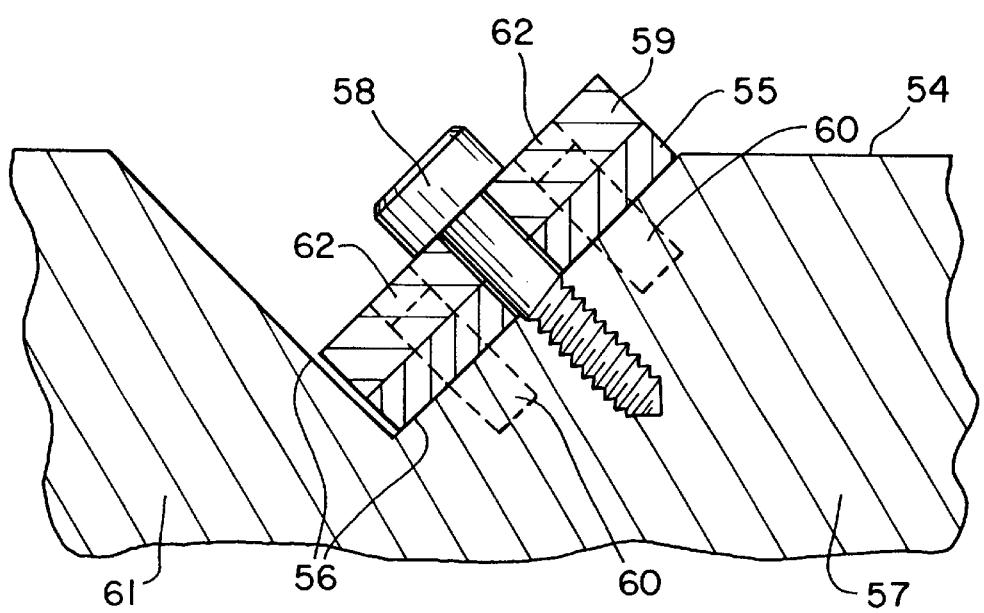
FIG. 5 is a sectional view of one of the vanes of the impeller shown in FIG. 4 taken at line 5—5.

Top surface 54 of hub 57, in this embodiment, includes a plurality of V-shaped notches 56 (FIG. 5) along periphery 61 which allow vanes 55 to be screwed onto top surface 54 at an acute, e.g., approximately 45°, angle with respect to top surface 54. Screws 58 are used to securely attach vanes 55 to hub 57 through clamp plates 59, each of which overlies a vane 55. Clamp plates 59 extend only as far as periphery 61 of hub 57 in the radially outward direction. Vanes 55 are locked in rotational alignment by two pins 60 which penetrate into recesses 62 on opposite sides of each screw 58. Each recess 62 extends through both a clamp plate 59 and a vane 55, and extends into hub 57.

Figure 6:
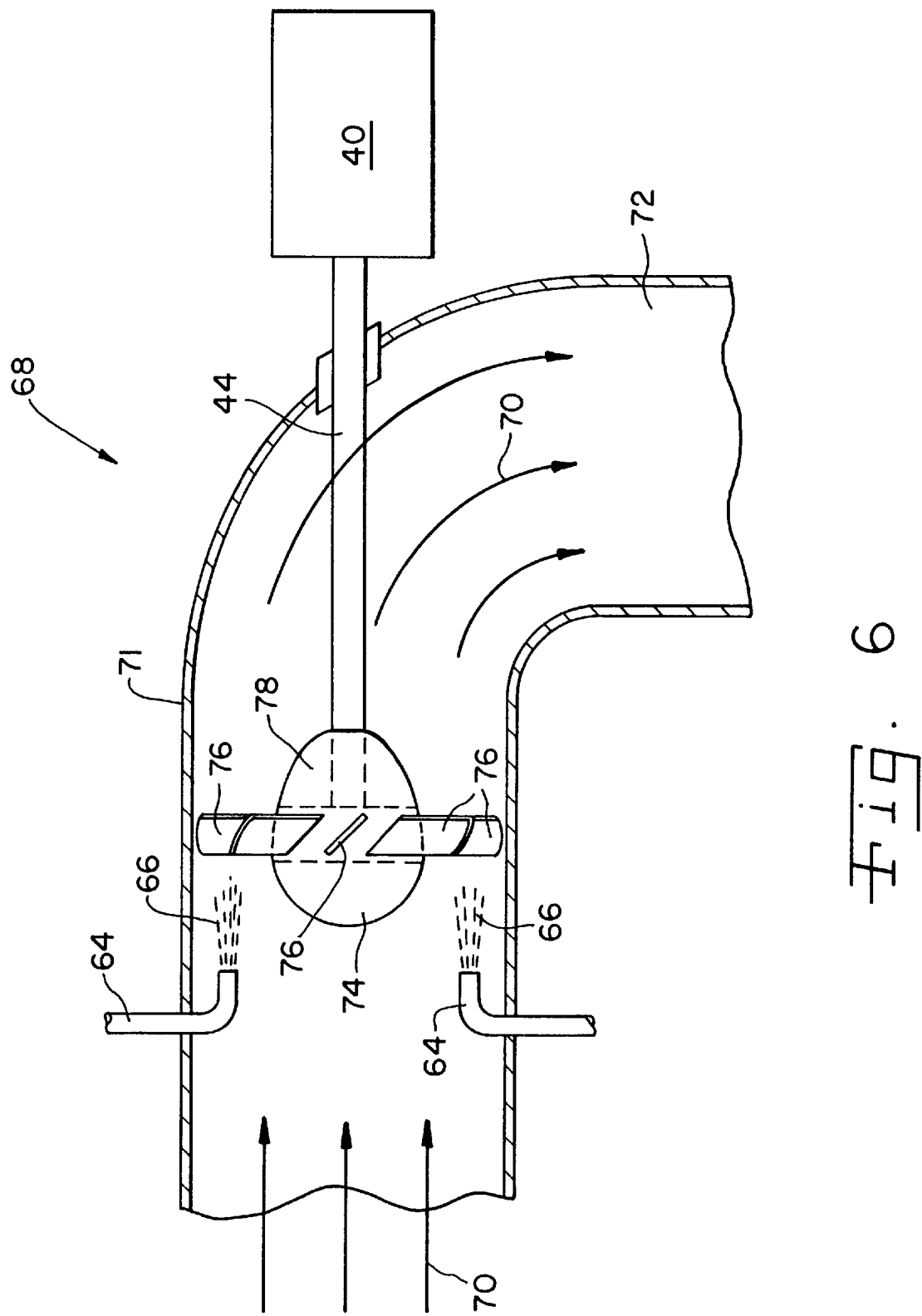
FIG. 6 is another embodiment of an axial blower of the present invention.

Another embodiment of a vacuum generating device is shown in FIG. 6 in the form of an axial blower 68 driven by a motor 40. Similar to the first embodiment described above, an air/mist/fiber mixture travels in the direction of arrows 70 through a housing 71 and is discharged into the ambient environment through a discharge nozzle 72, fluidly connected to and positioned downstream from impeller 78 in the direction of fluid flow. In this embodiment, however, an axial blower 68 is used rather than a centrifugal blower. Axial blower 68 includes eight vanes 76 (five of which are shown) which blow the air/mist/fiber mixture in a direction substantially parallel to shaft 44, rather than in a direction substantially transverse to shaft 44, as does centrifugal blower 30 of the first embodiment. Hub 74 of axial blower 68 has an aerodynamic teardrop shape to aid the flow of fluid in the axial direction and inhibit flow separation.

Vacuum generating device 68 also includes two intermittent cleaning nozzles 64 disposed within blower 68, allowing nozzles 64 to jet or spray a cleaning solution 66 onto vanes 76 as vanes 76 rotate. Cleaning nozzles 64 are positioned upstream from impeller 78 in the direction of air flow, facilitating the jetting of cleaning solution 66 onto vanes 76. The purpose of cleaning solution 66 is to clean vanes 76 of any buildup of fibers or dirt. Cleaning solution 66 can include a solvent and/or particulates, e.g. crushed walnut shells, which are capable of removing buildup from vanes 76 when striking them at high velocity. In this embodiment, hub 74 is formed of a corrosion resistant material, such as stainless steel or titanium. Vanes 76 are fabricated of a tough, flexible material, such as fiberglass or graphite composite, which is capable of withstanding the impacts of the fibers and particulates within the cleaning solution 66 without deformation. In this embodiment also, vanes 76 are covered with a non-stick, hydrophobic coating of PTFE, or other similar material.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims

What is claimed is:

1. A paper-making machine having a wet end associated with a wet fiber web, said paper-making machine comprising:

a headbox having an outlet gap;

a forming fabric positioned adjacent to said outlet gap and moving in a direction of web travel;

an air/water separator positioned in association with said forming fabric and downstream from said headbox relative to the direction of web travel said air/water separator configured for receiving liquid from the fiber web; and a blower fluidly connected with said air/water separator, said blower including a housing and an impeller, said impeller being rotatably carried by and within said housing and having a rotating hub with a periphery, said impeller further having a plurality of vanes attached to and extending from said hub and substantially equally spaced around said periphery, said vanes and said hub being monolithically and unitarily constructed of a non-metallic, composite material and having a coating of a layer bf hydrophobic material substantially covering said composite material.

2. The paper-making machine of claim 1, wherein said hydrophobic material comprises polytetrafluoroethylene.

3. The paper-making machine of claim 1, wherein said nonmetallic material comprises a graphite material.

4. The paper-making machine of claim 3, wherein said nonmetallic material comprises a graphite composite.

5. The paper-making machine of claim 1, wherein said blower comprises a centrifugal blower.

6. The paper-making machine of claim 1, wherein said blower comprises an axial blower.

7. The paper-making machine of claim 1, further comprising at least one cleaning nozzle within said blower and positioned upstream from said impeller relative to a direction of air flow, said at least one cleaning nozzle being configured for jetting cleaning fluid in an axial direction onto said vanes while said vanes rotate.

8. The paper-making machine of claim 7, wherein said at least one cleaning nozzle comprises a plurality of cleaning nozzles.

9. A paper-making machine having a wet end associated with a wet fiber web, said paper-making machine comprising:

a headbox having an outlet gap;

a forming fabric positioned adjacent to said outlet gap and moving in a direction of web travel;

an air/water separator positioned in association with said forming fabric and downstream from said headbox relative to the direction of web travel, said air/water separator configured for receiving liquid from the fiber web;

a blower fluidly connected with said air/water separator, said blower including a housing and an impeller, said impeller being rotatably carried by and within said housing and having a rotating hub with a periphery, said impeller further having a plurality of vanes attached to and extending from said hub and substantially equally spaced around said periphery, said vanes being comprised of a non-metallic, composite material and having a coating of a layer of polytetrafluoroethylene substantially covering said composite material;

at least one cleaning nozzle fluidly connected with said impeller, positioned upstream from said impeller relative to a direction of air flow, and configured for jetting cleaning fluid in an axial direction onto said vanes while said vanes rotate; and a discharge nozzle fluidly connected with said blower and positioned downstream from said impeller relative to a direction of air flow.

10. The paper-making machine of claim 9, wherein said blower comprises a centrifugal blower.

11. The paper-making machine of claim 9, wherein said blower comprises an axial blower.

12. The paper-making machine of claim 11, wherein said hub has an aerodynamic teardrop shape.

13. The paper making machine of claim 9, wherein said hub includes a top surface, said top surface including a plurality of V-shaped notches formed therein, each said notch having two intersecting side walls, each of said two side walls forming an acute angle relative to a respective adjoining portion of said top surface of said hub, each said vane attached to one of said two side walls of a corresponding said notch, said vanes thereby forming an acute angle relative to said top surface of said hub.

* * * * *

UNITED STATES PATENT AND TRADEMARK OFFICE
CERTIFICATE OF CORRECTION

PATENT NO. : 6,056,856
DATED : May 2, 2000
INVENTOR(S) : Edwin X. Graf

It is certified that error appears in the above-identified patent and that said Letters Patent is hereby corrected as shown below:

Column 4

Line 43, after pulp, delete "10".

Column 5

Line 2, delete "ITEFLON" and substitute --TEFLON-- therefor.

Signed and Sealed this

Third Day of April, 2001

Attest:

NICHOLAS P. GODICI

Attesting Officer

Acting Director of the United States Patent and Trademark Office